United States Patent [19]

Uhri et al.

[11] Patent Number: 5,033,307
[45] Date of Patent: Jul. 23, 1991

[54] BOREHOLE "CREEP" DISPLACEMENT TOOL

[75] Inventors: Duane C. Uhri, Dallas; Robin B. Montgomery, Mesquite, both of Tex.

[73] Assignee: Mobil Oil Corporation, Fairfax, Va.

[21] Appl. No.: 614,063

[22] Filed: Nov. 14, 1990

Related U.S. Application Data

[63] Continuation of Ser. No. 413,810, Sep. 28, 1989, abandoned.

[51] Int. Cl.$^5$ .................................................. G01B 5/00
[52] U.S. Cl. ........................................................ 73/784
[58] Field of Search ..................... 73/781–784; 33/1 H, 783

[56] References Cited

U.S. PATENT DOCUMENTS

| Re. 32,070 | 1/1986 | Vezin | 73/152 |
| 3,572,114 | 3/1971 | Ruppeneit et al. | 73/784 |
| 3,896,663 | 7/1975 | Ogura | 73/784 |
| 4,491,022 | 1/1985 | de la Cruz | 73/784 |
| 4,825,701 | 5/1989 | Holtslander | 73/782 |

Primary Examiner—Robert Raevis
Attorney, Agent, or Firm—Alexander J. McKillop; Charles J. Speciale; Charles A. Malone

[57] ABSTRACT

A method and apparatus to determine in-situ "creep" displacement in a cored or drilled borehole. A borehole creep displacement (BCD) tool is suspended into the borehole via a wireline logging cable. Gaging piston fluid forces gaging pistons in a mechanical/electrical assembly of said tool to extend and contact the borehole wall which causes gaging pressure to build. Upon reaching a predetermined pressure, excess fluid flows into a micro-motion fluid distribution body and into an actuator assembly causing an accumulator linear variable displacement transformer (ALVDT) to move thereby causing electrical signals to be transmitted to surface equipment. Once the LVDT has been displaced fully, a closed fluid system within the gaging pistons and a micro-motion assembly is created. Thereafter, any movement of the gaging pistons by the borehole wall will cause fluid motion of a micro-motion cylinder which is attached to a micro-motion LVDT. Movement of the micro-motion LVDT can be read as displacement in thousandths of an inch or as a direct mechanical gain for estimating electrical values.

18 Claims, 10 Drawing Sheets

BOREHOLE "CREEP" DISPLACEMENT TOOL

This is a continuation of copending application Ser. No. 413,810, filed on Sept. 28,1989, now abandoned.

FIELD OF THE INVENTION

This invention relates to a method and apparatus for the determination of stresses in-situ within a borehole located in a resource bearing formation.

BACKGROUND OF THE INVENTION

The composition of even the more common rock types is highly variable. For example, sandstones may be bonded with silica or calcite, or otherwise cemented; or the quartz content in granite may vary by a factor of three or more. In addition, in-situ rock is affected by geological actions such as faulting or jointing that (usually) are followed by chemical processes that produce alteration and decomposition. Unless mechanical property tests are conducted at a scale such that the test specimen includes these defects in normal proportion, the results will not be representative of the in-situ rock. The specimen size that satisfies this requirement is generally too large to be tested in the laboratory because of the physical limitations of test equipment. The alternative is to test in-situ. This procedure is limited by difficulties encountered in preparing an area (specimen) of a shape such that the test results will be interpretable and also in applying a force of sufficient magnitude to an area of this size.

As a consequence of these limitations, virtually no laboratory tests have been made on specimens large enough to contain defects of geological origin, and only a few in-situ tests have been made under conditions that permit a satisfactory interpretation.

In the majority of existing techniques, attempts are made to measure the "instantaneous" displacement directly. A good example of this is the 'overcoring" method. In this procedure, a wellbore is drilled to the horizon to be tested. At this point, a smaller hole is cored in the bottom of the wellbore and either a displacement or stress measuring tool is seated in the corehole. A larger core barrel is then used to cut around the rock containing the seated tool while it is operating. As the large core barrel cuts into the formation, the rock inside the barrel is released from the formation and displaces itself "instantaneously" with respect to the measurement tool.

Such techniques are not only difficult to perform, but are also time consuming. Stringent requirements on the various operational procedures tend to limit measurement depths to a few hundred feet. Most of these devices are limited to use in mines, tunnels, quarries, and other types of excavation sites.

Therefore, what is needed is a method and tool to perform in-situ creep measurements in a formation immediately after it has been drilled or cored and which can be employed at depths exceeding a few hundred feet.

SUMMARY OF THE INVENTION

This invention is directed to a method and apparatus for measuring borehole wall displacements due to stress relief immediately after coring or drilling a formation. In the practice of this method, a borehole creep displacement measurement tool is suspended in said borehole via a wireline logging cable. Hydraulically operated gaging pistons contained in said tool contact the sides of said borehole. One of the three pairs of said pistons is used as a reference. The orientation of the reference pistons is established gyroscopically or magnetically after said reference pistons are seated against said borehole wall.

A second pair of gaging pistons is oriented at about 60° to said reference pistons. Thereafter, a third pair of gaging pistons is oriented at about 120° to said reference pistons by the mechanical construction of said tool. The individual pistons in a pair extend in opposite directions and, together, represent a diameter of the wellbore. Each pair of gaging pistons is coupled to a micro-motion piston and its associated Linear Variable Differential Transformer (LVDT) via hydraulic fluid in order to measure borehole creep displacements. Movement of the borehole wall causes a corresponding movement of the gaging pistons.

Movement of the gaging pistons is sensed by the micro-motion piston as the gaging piston fluid is displaced into the micro-motion piston cylinder. The magnitude of the response of the micro-motion piston depends upon its diameter, as well as the diameters and strokes of the gaging pistons. The distance moved by the micro-motion piston is determined by dividing the gaging piston surface area by the micro-motion piston surface area. Resultant measurements may be read as displacement of the micro-motion piston in thousandths of an inch or as a direct mechanical gain for estimating electrical values.

It is therefore an object of this invention to provide a method and apparatus for making actual in-situ measurements at oil well depths.

It is a further object of this invention to provide a method and apparatus which eliminates the problem of overburden estimates as measurements are made in-situ where the overburden stress has not been relieved.

It is still further object of this invention to provide a method and apparatus which will make in-situ creep measurements where such measurements are unaffected by temperature fluctuations, pressure fluctuations and micro-cracking effects.

It is a yet further object of this invention to provide a method and tool which will provide data necessary to determine directions and magnitudes of principal stresses as well as permitting the calculation of the sheer modulus, compressibility, rock viscosity, Young's modulus and Poisson's ratio.

It is still yet further object of this invention to provide a method and tool to reflect more of the "static" or long term properties of the formation.

It is another yet still further object of this invention to provide a method and tool to reflect more of the "static" or long term properties of the formation at oil well depths.

DESCRIPTION OF THE PREFERRED EMBODIMENTS

This invention is directed to a method and tool designed to measure borehole wall displacements due to stress relief immediately after coring or drilling a formation. The tool is an electro-mechanical wireline apparatus which uses hydraulically operated pistons to contact the sides of the wellbore. Piston motion is monitored to provide the necessary borehole "creep" data. "Creep" is defined herein as rock deformation caused when stress acting on a volume of rock is changed.

Figure 1:
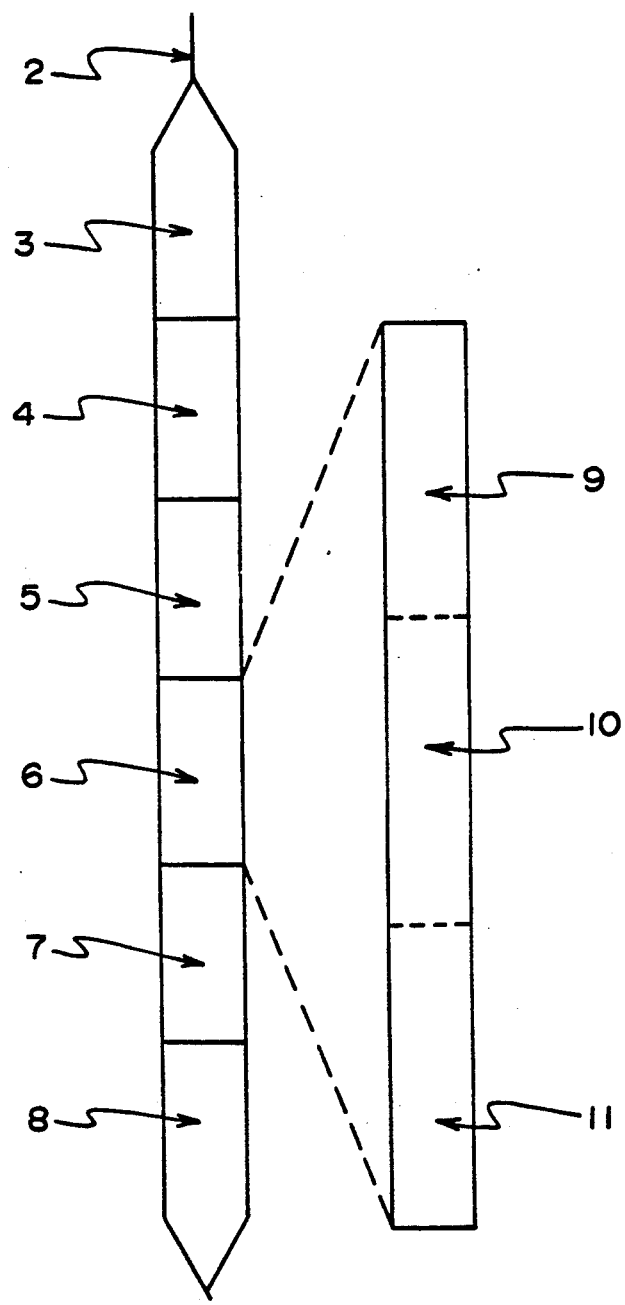
FIG. 1 depicts an embodiment of a borehole creep displacement measurement tool where the mechanical and gaging assembly section has been enlarged.

FIG. 1 provides a generalized illustration of an embodiment of a borehole creep displacement measurement tool. This tool is designed to run on wireline logging cable 2 and consists of the following assemblies: a magnetometer assembly 3 for directional orientation of the measurements; two centralizer assemblies 4 and 7 to place the tool in the center of the borehole; an electronics section 5 where all data collection and transmission to the surface are handled; a mechanical and gaging assembly 6 consisting of an actuator assembly 9 to extend and retract gaging pistons; a gaging assembly 10 which contains gaging pistons and a micro-motion assembly to measure radial borehole creep displacement; a pressure equalization assembly 11 to compensate for borehole pressure; and a pressure/temperature measurement sub 8.

Gyroscope, centralizers, and magnetometer assemblies are currently manufactured and incorporated into many logging tools in various ways. Parts for these assemblies are currently being manufactured and can be purchased. These assemblies and parts therefor have been modified and placed within the tool used herein. A directional gyro, model DG29-0704-1, manufactured by Humphrey Inc., San Diego, Calif., was incorporated into the tool. A toroidal magnetometer core was purchased from M-W Instruments, Dallas, Tex. and incorporated into the tool. Several kinds of centralizers are available. Among these are included spring (bow) and rubber finger centralizers. Temperature/pressure sub units for use with the tool can be obtained from Hewlett-Packard. The electronics section can be constructed from off the self-materials which are available from electrical suppliers. Placement of the sections is not critical to the functioning of the tool as will be understood by those skilled in the art. Therefore, this description will be directed to the mechanical and gaging assembly 6.

Figure 6:
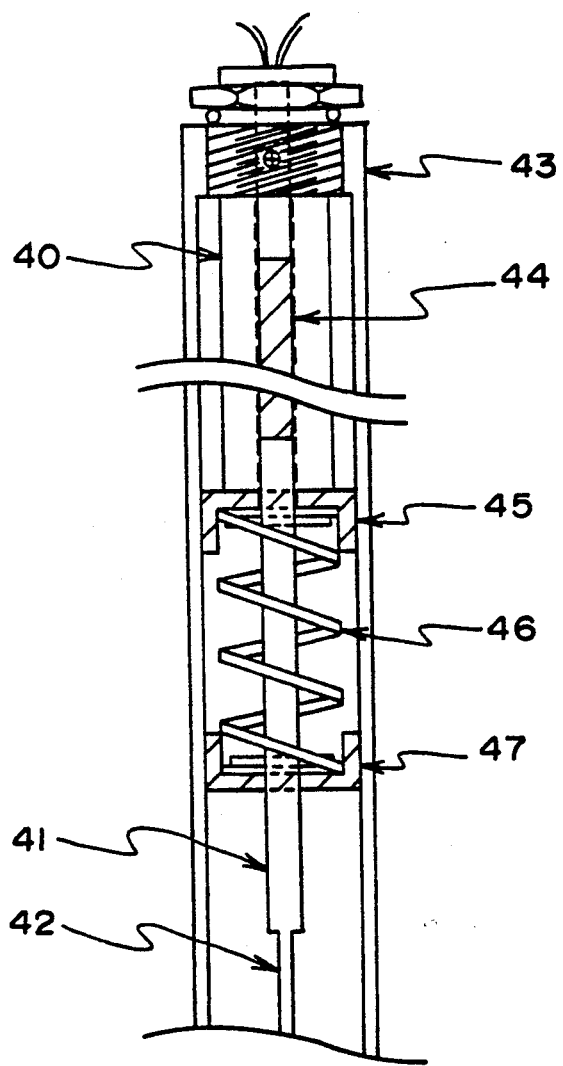
FIG. 6 is a sectional view of a micro-motion linear variable differential transformer (LVDT) located within the gaging assembly.
Figure 7:
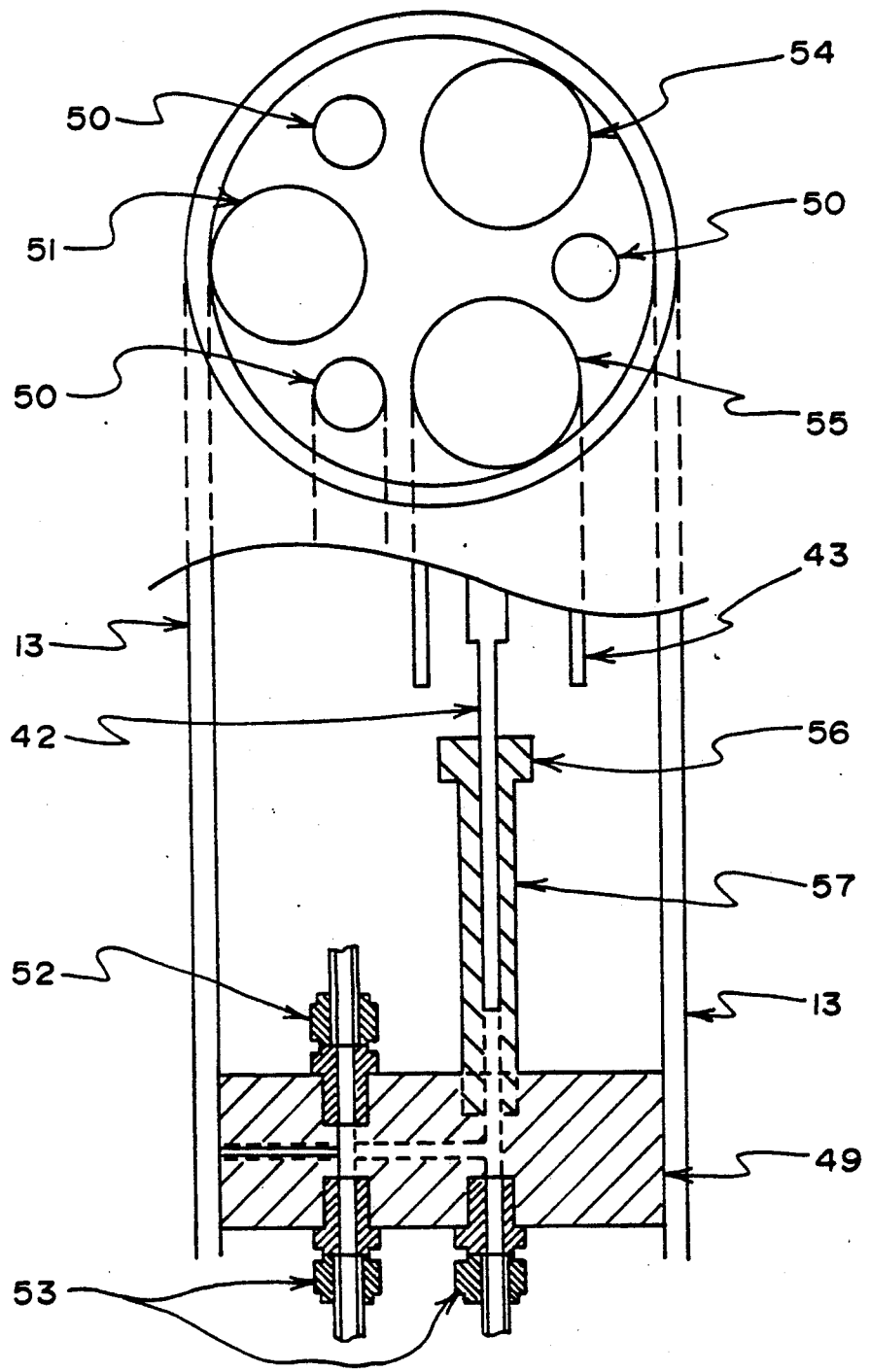
FIG. 7 is a sectional and cross-sectional view of a micro-motion piston assembly located within the gaging assembly.
Figure 9:
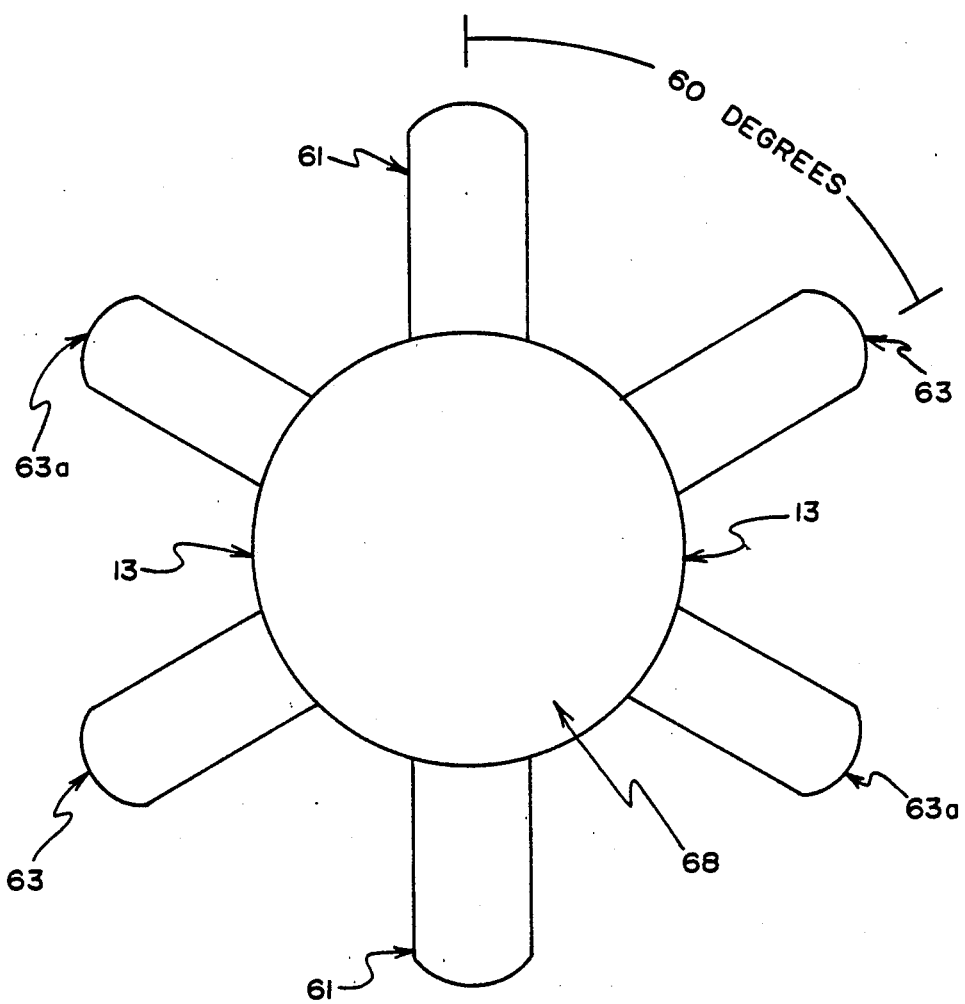
FIG. 9 is a cross-sectional view of the gaging assembly wherein the gaging body is shown with the pistons extended.

The mechanical and gaging assembly 6 contains three pairs of hydraulically operated gaging pistons with one pair used as a reference. These gaging pistons are shown in FIG. 9. The orientation of first pair 61 is established magnetically after the gaging pistons are seated against the borehole wall. As is shown in FIG. 9, a seccond pair 63 is oriented at 60°. A third pair 63a is oriented at 120° to pair 61 by mechanical construction of the tool. The individual pistons in a pair extend in opposite directions and, together, represent a diameter of the wellbore. Each pair of gaging pistons is coupled to a micro-motion piston 42 as is shown in FIGS. 6 and 7 along with a Linear Variable Differential Transformer (LVDT) via a hydraulic fluid in order to measure borehole creep displacement. A description of one pair of gaging pistons follows. There are three complete and independent gaging pistons systems in the tool.

Figure 2:
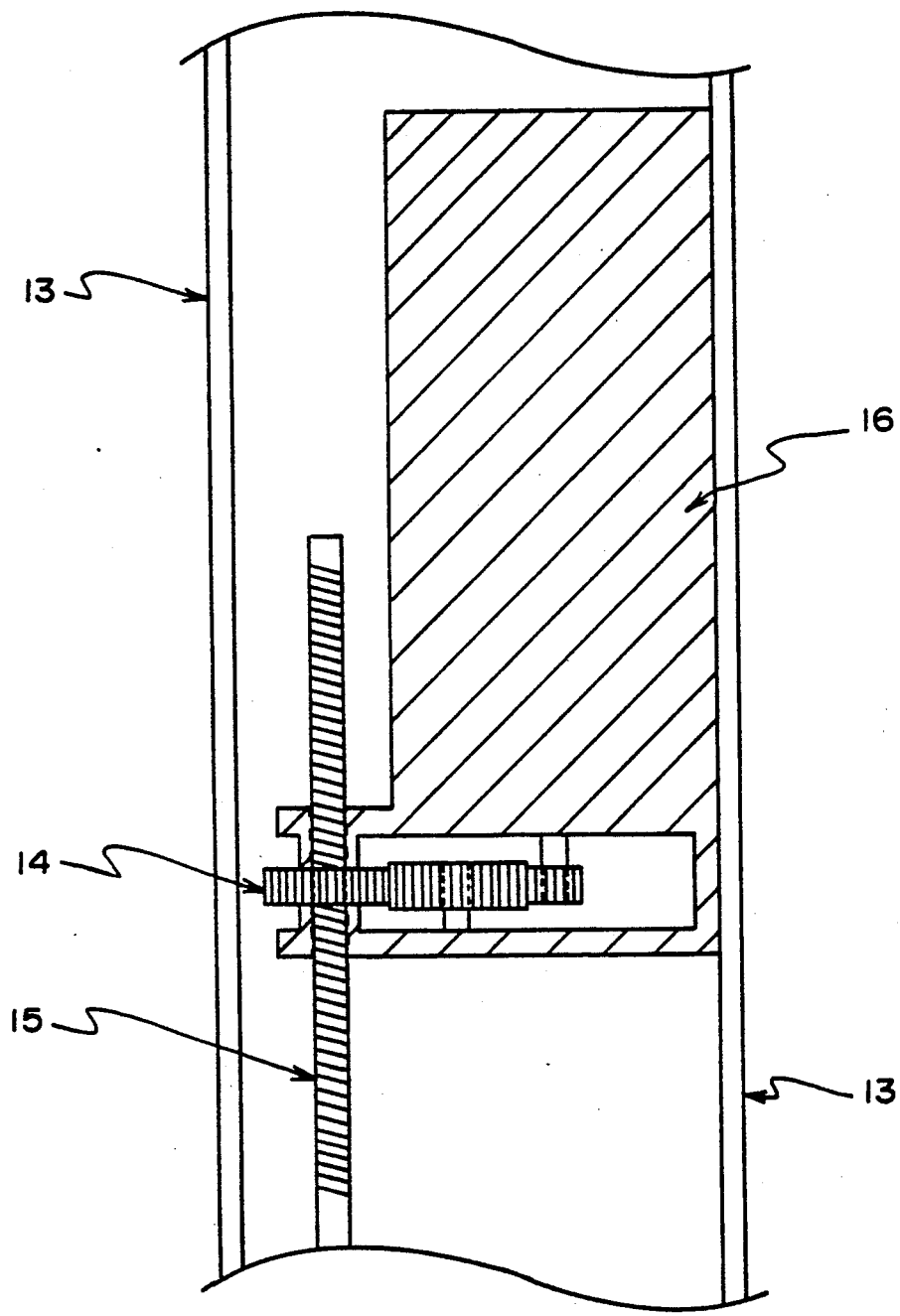
FIG. 2 is a sectional view of the drive mechanism contained within the actuator assembly.
Figure 3:
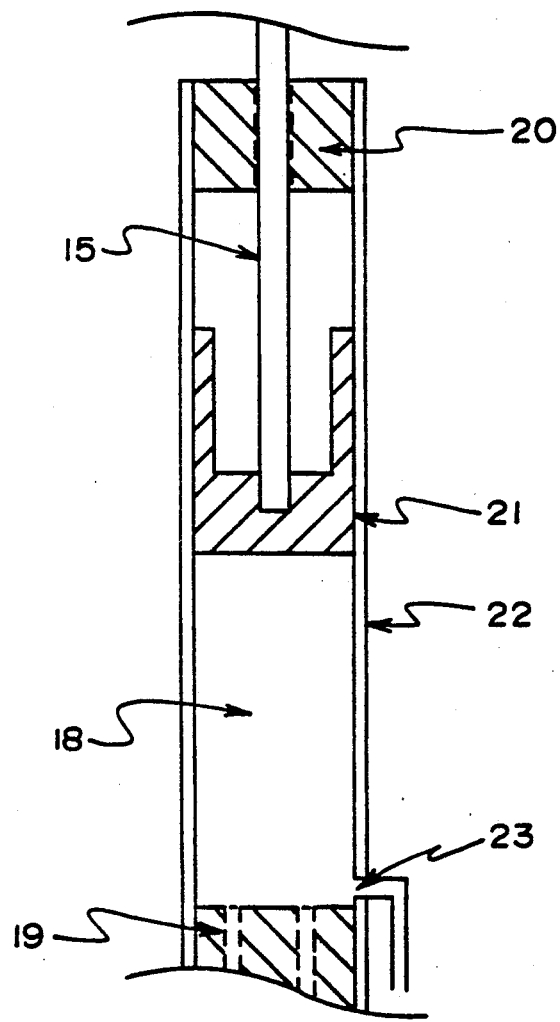
FIG. 3 is a sectional view of the actuator piston within the actuator assembly.
Figure 8:
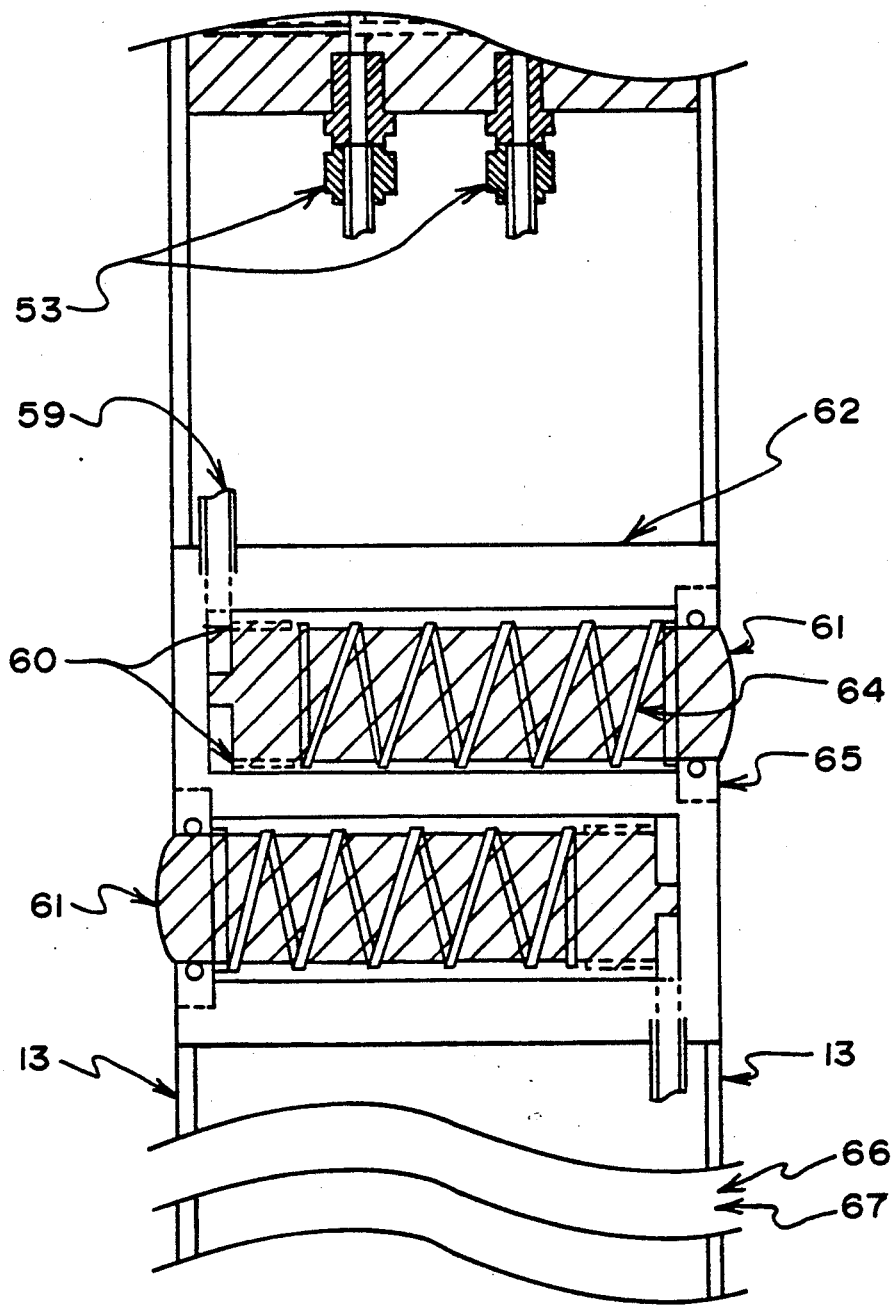
FIG. 8 is an enlarged sectional view of the gaging assembly depicting a pair of gaging pistons and parts communicating therewith.

Hydraulically operated gaging pistons, e.g. 61, 63 and 63a, contained in gaging assembly 10 are fluidly conneted to actuator assembly 9, as is shown in FIG. 1. Actuator assembly 9, as is shown in FIG. 2, contains within tool wall 13 an actuator drive shaft 15 gearable connected to gear assembly 14, which is affixed to motor 16. Motor 16 operates actuator drive shaft 15 through gear assembly 14. Actuator drive shaft 15, as is shown in FIG. 3, within the actuator piston assembly, is connected to actuator piston 21. Actuator piston 21 is contained in actuator cylinder 22 which is filled with gaging piston fluid 18. When motor 16 is energized, actuator drive shaft 15 causes actuator piston 21 to exert pressure on gaging piston fluid 18. Gaging piston fluid 18 is forced out of actuator cylinder 22 through actuator cylinder port 23 to the micro-motion fluid distribution body 49, as is shown in FIG. 7. Drive shaft guide and ant-rotation device 20 maintain alignment and prevent rotation of the actuator drive shaft 15, as is shown in FIG. 3. Gaging piston fluid 18 forces the gaging pistons as shown in FIGS. 8 and 9 to extend and contact the borehole wall, at which time the gaging pressure starts to build. As shown in FIG. 8, space is provided for a second 66 and third 67 pair of pistons. These pistons are not shown. When the gaging pressure reaches a predetermined operating pressure, seating pressure valve body 19 permits the excess fluid to flow through it. Actuator piston 21 continues to move until it seals off actuator cylinder port 23.

Figure 4:
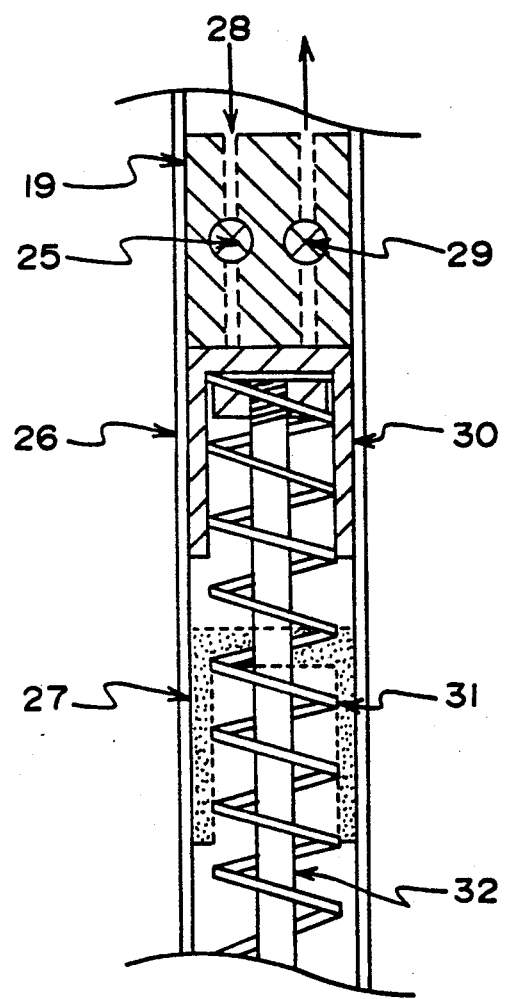
FIG. 4 is a sectional view of the seating pressure regulator and accumulator piston within the actuator assembly.

As is shown in FIG. 4, the seating pressure regulator and accumulator piston (actuator assembly) details the location of seating pressure valve 25 and release pressure valve body 19. Excess fluid 28 enters accumulator cylinder 26 and drives accumulator piston 30. Accumulator piston 30 can travel from the non-operating position of piston 30 to as far as the minimum extension position 27. Accumulator piston 30, in turn, drives accumulator LVDT core shaft 32.

Figure 5:
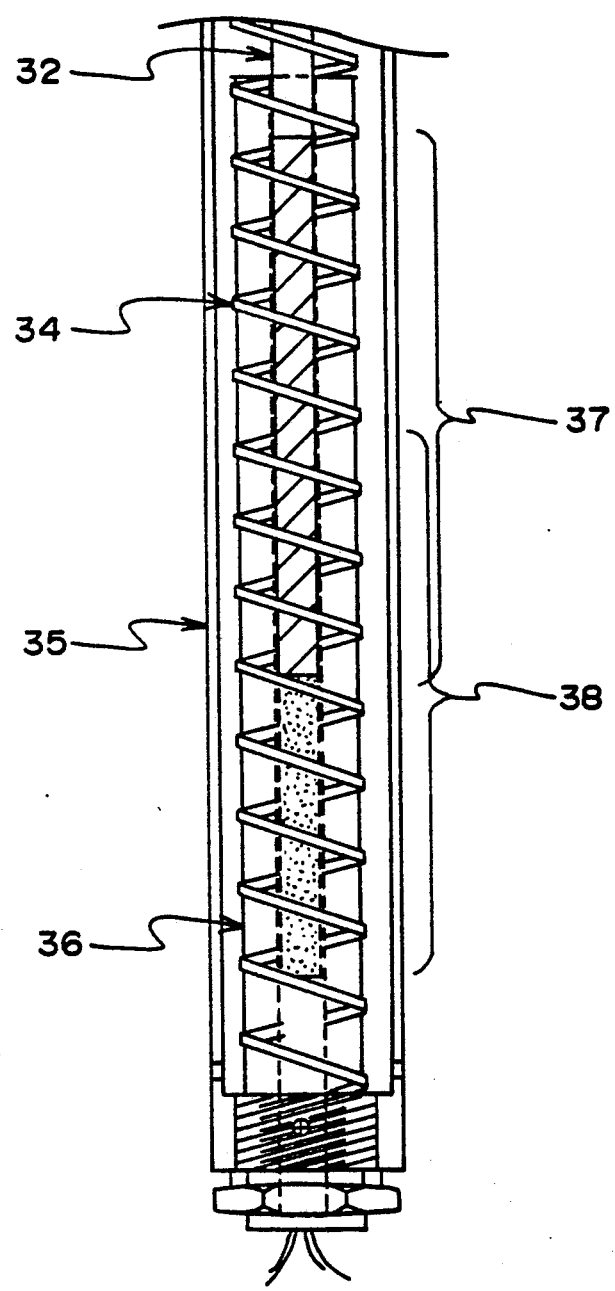
FIG. 5 is a sectional view of an accumulator linear variable differential transformer (LVDT) located within the gaging assembly.

FIG. 5 represents the accumulator LVDT (actuator assembly) and shows the relationship of accumulator LVDT core shaft 32 to accumulator LVDT body 36. Movement of the accumulator LVDT core shaft 32 changes the location of accumulator LVDT core positions 37 and 38. By monitoring the displacement of accumulator LVDT core, the diameter of the borehole can be determined. As illustrated, accumulator LVDT core shaft 32, accumulator piston return spring 34 and the accumulator LVDT body 36 are all housed in accumulator cylinder 35.

When actuator piston 21 as shown in FIG. 3 has completed its full stroke, actuator cylinder port 23 is sealed off, thereby creating a closed fluid system within gaging pistons 61, as shown in FIG. 8, and the micro-motion assembly shown in FIGS. 6 and 7. Gaging pistons 61 in contact with the borehole wall will react to a movement of the wall. Gaging pistons 61 are coupled hydraulically to the micro-motion cylinder 57 shown in FIG. 7. With actuator cylinder port 23 sealed off, any movement of the gaging pistons 61 will be transfered to micro-motion piston 42 by gaging piston fluid 18.

FIG. 6 detailing the micro-motion (gaging assembly) shows that the micro-motion piston 42 is attached to micro-motion LVDT core shaft 41. When micro-motion piston 42 begins to move, it will move the LVDT core shaft 41 and this movement will continue until the seating pressure has been attained. Due to the micro-motion seating pressure compensation spring 46, the micro-motion LVDT core will be seated close to its center position 44. Micro-motion sliding spring retainer 47 is attached to micro-motion LVDT core shaft 41. The micro-motion fixed spring retainer 45 is attached to the LVDT mounting assembly 43.

FIG. 7 illustrates the micro-motion piston assembly (gaging assembly). With respect to FIG. 3, gaging piston fluid 18 moves out of actuator piston 21 through the actuator cylinder port 23 to the micro-motion fluid distribution body. Fluid enters via tubing and fluid fitting 52 and is distributed through the fitting and tubing to a gaging cylinder pair 53 and also to micro-motion cylinder 57.

FIG. 8 depicts the gaging body (gaging assembly) and shows a gaging cylinder pair as gaging pistons 61. Gaging piston fluid 18 as shown in FIG. 3 moves gaging pistons 61 outward until the borehole wall is contacted. Once contact has been made by both pistons, pressure starts to build in acutator cylinder 22 (FIG. 3), in the gaging pistons 61 and in micro-motion cylinder 57 (FIG. 7).

The diameter of the micro-motion piston 42 is smaller than the diameters of the gaging pistons 61. This causes a displacement of micro-motion piston 42 which is greater than the combined displacements of the pair of gaging pistons 61. This constitutes mechanical gain. Micro-motion piston 42, centered by the seating pressure on piston fluid 18, measures a positive or negative movement of gaging pistons 61. Micro-motion cylinder 57 can supply a limited amount of fluid in the case of an increasing borehole diameter. The embodiment allows micro-motion piston 42 a positive or negative displacement of approximately 0.500 inch. This represents a maximum borehole wall motion of plus or minus 0.005 (five thousandths) inch.

To disengage the measuring system, gaging pistons 61 are retracted by reversing motor 16 and pulling on actuator piston 21. Release pressure valve 29 allows some fluid to flow in order to let motor 16 start. When actuator cylinder port 23 to micro-motion fluid distribution body 49 is opened by actuator piston 21, fluid is pulled back into the actuator cylinder 22, causing the gaging pistons 61 to retract. Gaging piston return spring 64 associated with each of gaging pistons 61 assists in the retraction process. Micro-motion piston 42 also returns to a retracted position as part of this operation.

Figure 10:
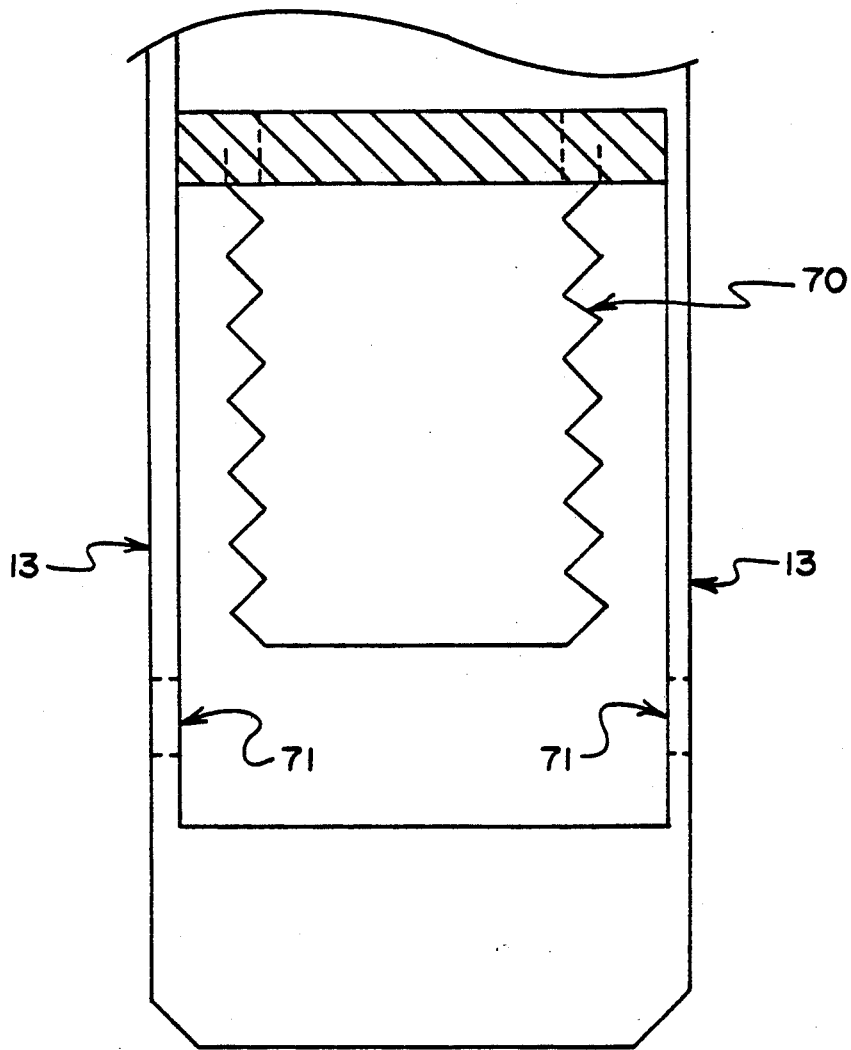
FIG. 10 is an enlarged sectional view of the pressure equalization assembly.

FIG. 10 shows the pressure equalization assembly which consists of a pressure equalization bellows 70 along with borehole fluid pressure equalization ports 71 in tool wall 13. Mechanical and gaging assembly 6 is completely filled with oil and pressure within this assembly is equalized with the borehole pressure. This allows the entire gaging system to operate in a low differential pressure environment.

Uniquely, this embodiment allows achievement of mechanical advantage by the hydraulic system associated with the micro-motion measurement. Mechanical gain is obtained through a set of pistons, one pair in contact with the borehole wall (gaging pistons) and a single smaller piston (micro-motion piston) connected to an LVDT. Movement of the gaging pistons is sensed by the micro-motion piston connected to an LVDT. Movement of the gaging pistons is sensed by the micro-motion piston as the gaging piston fluid is displaced into the micro-motion piston cylinder. The magnitude of the response of the micro-motion piston depends not only upon its diameter, but also upon the diameters and strokes of the gaging pistons. Calculations in the following discussion will be relative to the combined motions of the gaging pistons of 0.001 inch.

Five gaging pistons diameters were utilized. These are listed in Table 1.

TABLE 1

| Gaging Piston Diameter (inches) | Gaging Piston Surface Area (sq. inches) |
| --- | --- |
| 0.750 | 0.4417864 |
| 0.800 | 0.5026548 |
| 0.812 | 0.5178475 |
| 0.875 | 0.6013204 |
| 1.000 | 0.7853981 |

When the hydraulic fluid is displaced by the gaging pistons, the micro-motion piston will move a distance that may be determined by dividing the gaging piston surface area by the micro-motion piston surface area. The result may be read as displacement in thousandths of an inch or as a direct mechanical gain for estimating electrical values.

Eleven micro-motion piston diameters were considered. Table 2 shows the micro-motion mechanical gains for various combinations of these with the gaging pistons of Table 1.

TABLE 2

| MICRO-MOTION PISTON | | MICRO-MOTION MECHANICAL GAIN RELATIVE TO A GAGING CYLINDER DIAMETER OF | | | | |
| --- | --- | --- | --- | --- | --- | --- |
| Diameter (in.) | Area (sq. in.) | 0.75 (in.) | 0.80 (in.) | 0.812 (in.) | 0.875 (in.) | 1.00 (in.) |
| 0.05 | 0.001963 | 225.0000 | 256.0000 | 263.7376 | 306.2500 | 400.0000 |
| 0.06 | 0.002827 | 156.2500 | 177.7777 | 183.1511 | 212.6736 | 277.7777 |
| 0.07 | 0.003848 | 114.7959 | 130.6122 | 134.5600 | 156.2500 | 204.0816 |
| 0.08 | 0.005026 | 87.8906 | 100.0000 | 103.0225 | 119.6289 | 156.2500 |
| 0.09 | 0.006361 | 69.4444 | 79.0123 | 81.4004 | 94.5216 | 123.4567 |
| 0.10 | 0.007853 | 56.2500 | 64.0000 | 65.9344 | 76.5625 | 100.0000 |
| 0.11 | 0.009503 | 46.4876 | 52.8925 | 54.4912 | 63.2747 | 82.6446 |
| 0.12 | 0.011309 | 39.0625 | 44.4444 | 45.7877 | 53.1684 | 69.4444 |
| 0.13 | 0.013273 | 33.2840 | 37.8698 | 39.0144 | 45.3032 | 59.1715 |
| 0.14 | 0.015393 | 28.6989 | 32.6530 | 33.6400 | 39.0625 | 51.0204 |

TABLE 2-continued

| MICRO-MOTION PISTON | | MICRO-MOTION MECHANICAL GAIN RELATIVE TO A GAGING CYLINDER DIAMETER OF | | | | |
|---|---|---|---|---|---|---|
| Diameter (in.) | Area (sq. in.) | 0.75 (in.) | 0.80 (in.) | 0.812 (in.) | 0.875 (in.) | 1.00 (in.) |
| 0.15 | 0.017671 | 25.0000 | 28.4444 | 29.3041 | 34.0277 | 44.4444 |

In order to measure the movement of the pistons, an LVDT was selected with characteristics that allow for operation harsh in environments. Table 3 gives the sensitivity, travel and conversion information for nine LVDT's. These are obtainable from Schaevitz Engineering as off-the-shelf items and are referenced in Table 3 with their part numbers.

TABLE 3

| LVDT SENS MV/V .001 IN | LVDT TRAVEL RANGE +/− (IN) | SENS MV/V AT 3 V EXC | LVDT OUTPUT FULL + TRAVEL (IN MV) | V GAIN FOR 10 VOLTS SIGNAL OUTPUT | ACTUAL MV/per .001 IN TRAVEL | SCHAEVITZ PART NUMBER |
|---|---|---|---|---|---|---|
| 5.0 | 0.050 | 15.0 | 750 | 13.33333 | 200.000 | 049XS-C |
| 2.4 | 0.150 | 7.2 | 1080 | 9.25925 | 66.666 | 149XS-C |
| 1.7 | 0.250 | 5.1 | 1275 | 7.84313 | 40.000 | 249XS-C |
| 1.1 | 0.500 | 3.3 | 1650 | 6.06060 | 20.000 | 499XS-C |
| 4.2 | 0.050 | 12.6 | 630 | 15.87301 | 200.000 | 050HPA |
| 2.4 | 0.125 | 7.2 | 900 | 11.11111 | 80.000 | 125HPA |
| 1.6 | 0.250 | 4.8 | 1200 | 8.33333 | 40.000 | 250HPA |
| 1.1 | 0.500 | 3.3 | 1650 | 6.06060 | 20.000 | 500HPA |
| 0.9 | 1.000 | 2.7 | 2700 | 3.70370 | 10.000 | 1000HPA |

Since the data obtained will be in analog electronic form, a conversion to digital information is desirable for transmission to the surface. Table 4 gives the volt-per-bit values for analog/digital (A/D) converters from 8 bits to 16 bits. It shows the need for careful selection of the A/D converter. This Table gives the actual volts per count of the A/D's as related to a single-ended 10 volt signal and a bipolar + and −10 volt signal.

TABLE 4

| ANALOG TO DIGITAL CONVERTER | CONVERTER USABLE NUMBER OF BITS | CONVERTER BIT VALUE AT +/− 10 V (volts/bit) | CONVERTER BIT VALUE AT + 10 V (volts/bit) |
|---|---|---|---|
| 8 bit | 128 | 0.1562500 | 0.0781250 |
| 9 bit | 256 | 0.0781250 | 0.0390625 |
| 10 bit | 512 | 0.0390625 | 0.0195312 |
| 11 bit | 1024 | 0.0195312 | 0.0097656 |
| 12 bit | 2048 | 0.0097656 | 0.0048828 |
| 13 bit | 4096 | 0.0048828 | 0.0024414 |
| 14 bit | 8192 | 0.0024414 | 0.0012207 |
| 15 bit | 16384 | 0.0012207 | 0.0006103 |
| 16 bit | 32768 | 0.0006103 | 0.0003051 |

In order to minimize computation, Table 5 was created to allow for a quick means of determining the theoretical sensitivity of the measuring tool. Only the bipolar A/D is considered here. The LVDT sensitivites in Table 3 and the A/D bit values in Table 4 are used to establish Table 5. MV/V values shown in the first vertical column of Table 3 are used as the headings for Table 5, exclusive of the A/D bit values from Table 4.

TABLE 5

| A/D CONVERTER | MV/V 5 | MV/V 2.4 | MV/V 1.7 | MV/V 1.1 | MV/V 4.2 |
|---|---|---|---|---|---|
| 8 bit | 1.280 | 0.4266 | 0.256 | 0.128 | 1.280 |
| 9 bit | 2.560 | 0.8533 | 0.512 | 0.256 | 2.560 |
| 10 bit | 5.120 | 1.7066 | 1.024 | 0.512 | 5.120 |
| 11 bit | 10.240 | 3.4133 | 2.048 | 1.024 | 10.240 |
| 12 bit | 20.480 | 6.8266 | 4.096 | 2.048 | 20.480 |
| 13 bit | 40.960 | 13.6533 | 8.192 | 4.096 | 40.960 |
| 14 bit | 81.920 | 27.3066 | 16.384 | 8.192 | 81.920 |
| 15 bit | 163.840 | 54.6133 | 32.768 | 16.384 | 163.840 |
| 16 bit | 327.680 | 109.2266 | 65.536 | 32.768 | 327.680 |
| A/D | MV/V | MV/V | MV/V | MV/V | |
| CONVERTER | 2.1 | 1.6 | 1.1 | 0.9 | |
| 8 bit | 0.512 | 0.256 | 0.128 | 0.064 | |
| 9 bit | 1.024 | 0.512 | 0.256 | 0.128 | |
| 10 bit | 2.048 | 1.024 | 0.512 | 0.256 | |
| 11 bit | 4.096 | 2.048 | 1.024 | 0.512 | |
| 12 bit | 8.192 | 4.096 | 2.048 | 1.024 | |
| 13 bit | 16.384 | 8.192 | 4.096 | 2.048 | |
| 14 bit | 32.768 | 16.384 | 8.192 | 4.096 | |
| 15 bit | 65.536 | 42.768 | 16.384 | 8.192 | |
| 16 bit | 131.072 | 65.536 | 32.768 | 16.384 | |

The following computation illustrates the theoretical resolution of the system in millionths of an inch per step of the A/D (i.e. micro-inches/step). Only Table 2 and Table 5 need be consulted to determine this resolution. The equation used is:

$$R = (0.001) * (10E + 6)/(X * Y)$$

where
R = measurement resolution in micro-inches/step of the A/D
X = mechanical gain selected from Table 2
Y = A/D converter steps per 0.001 inch at mv//v selected from Table 5

As an example, the following steps detail how to obtain R when a micro-motion piston diameter of 0.1 inch is used. In Table 2, the intersection of the column for an 0.8 inch diameter gaging piston and the row for a 0.1 inch diameter micro-motion piston give a mechanical gain of X=64. If an LVDT with a sensitivity of 1.1 mv/v and + or −0.5 inch travel coupled with a 14 bit A/D converter is used from Table 5, we find Y=8.192 steps per 0.001 inch of movement. Applying these two values to the preceding equation, we obtain:

$$R = ((0.001)(1.0 \times 10^6))/((64)(8.192))$$
$$= 1.9 \text{ micro-inches per step of the } A/D$$

There are several advantages associated with this invention. One advantage is that this BCD tool makes in-situ measurements and can be operated from a wireline (logging cable). Most other tools require tubing. This tool can be used at oil well depths, i.e. up to about 10,000 feet or more, while most other toods are limited to a few hundred feet.

The borehole for the tool does not have to meet extremely rigid requirements. The U.S. Bureau of Mine Tools requires a smooth hole and a tool clearance of not more than approximately 1 mm. The BCD tool, which is 3 inches in diameter, can be used on an operational basis in boreholes just allowing for tool clearance up to 6½ inches in diameter (7 inches maximum). Of course larger diameter boreholes can be measured by utilizing a tool with a corresponding increase in diameter.

Use of this tool eliminates the problem of overburden estimates, since it makes measurement in-situ where the overburden stress has not been relieved. Water or other fluids in the borehole do not limit the tool's capabilities.

The tool operates at low differential pressures due to its pressure equalization design. Extremely high pressures are required in the use of rock dilatometer-type tools. Since strain relaxation creep is measured, the formation is not disturbed by pressuring it up or by driving penetrometer-type devices into it. This should provide for more reliable data.

Creep measurements performed with the BCD tool in-situ should be much more representative of the formation than laboratory measurements on cores due to the "specimen" size effects. It has been shown that size effect can show up in the ratio of field to laboratory strengths. This ratio sometimes attains values of 10 or more. Temperature and pressure fluctuations and micro-cracking effects due to removing core specimens from the borehole for laboratory measurements have no apparent counterparts in the use of the BCD tool.

Not only will the BCD tool provide the data necessary to determine the directions and magnitudes of the principal stresses, but it will also permit the calculation of the shear modulus, compressibility, rock viscosity, Young's modulus and Poisson's ratio. Results from the use of this tool should reflect more of the "static" or long term properties of the formation, rather than the dynamic or short term responses to various types of excitation.

The design of the BCD tool is focused on the use of LVDT's as opposed to strain gages. LVDT's are more reliable and suffer fewer problems associated with hostile environments. Most existing tools are strain gage devices.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed is:

1. In a borehole measurement tool having a magnetometer assembly for directional orientation of the measurements; at least one centralizer assembly for placement of the tool in the center of the borehole; an electronics assembly where all data collection and transmission to the surface are handled and transmitted to the surface by a wireline logging cable; and a subassembly pressure/temperature measurement; the improvement comprising:
   a) a mechanical and gaging assembly which is mechanically and electrically interconnected into said electronics assembly comprising;
      i) an actuator assembly means to extend and retract at least one pair of gaging pistons,
      ii) a gaging assembly means which contains gaging pistons fluidly connected with a second piston having a substantially smaller diameter than said gaging pistons where said second piston is interconnected with a linear variable differential transformer shaft whereupon movement of the gaging pistons causes said shaft to move which results in a mechanical gain because of the smaller diameter of said second piston; and
      iii) a means for measuring the mechanical gain obtained from movement of said shaft which results in the obtainment of minute measurements of borehole creep.

2. The tool as recited in claim 1 wherein step a) i) three pairs of gaging pistons are utilized.

3. The tool as recited in claim 1 where the gaging pistons seat to said borehole causing transfer fluid movement to an accumulator piston that moves an LVDT shaft which causes an electrical signal to be emitted which can be used to determine the borehole's diameter.

4. The tool as recited in claim 1 where the mechanical and gaging assembly contain a pressure equalization assembly which allows the tool to operate in a low differential pressure environment.

5. The tool as recited in claim 1 where any movement of the gaging piston is transferred to said second piston by gaging piston fluid when an actuator cylinder port is sealed off.

6. The tool as recited in claim 1 where in step a) ii) the second piston measures a positive or a negative movement of the gaging pistons when said second piston is centered by seating pressure exerted on fluid communicating with said second piston.

7. The tool as recited in claim 1 where in step a) ii) the second piston has a positive or negative displacement of about 0.500 inch which represents a maximum borehole wall motion of plus or minus 0.005 inch.

8. The tool as recited in claim 1 where the gaging pistons are disengaged by reversing an electrical motor which causes fluid flow pressure on closed fluid pressure within said actuator assembly means to be reduced.

9. The tool as recited in claim 1 where measurements obtained from step a) ii) are used to determine directions and magnitudes of principal stresses, and to calculate shear modulus, compressibility, rock viscosity, Young's modulus, and Poisson's ratio.

10. In a method for measuring borehole creep in-situ where a borehole measurement tool is suspended in said borehole where said tool has a magnetometer assembly for directional orientation of the measurements; at least one centralizer assembly for placement of the tool in the center of the borehole; an electronics assembly where all data collection and transmission to the surface are handled and transmitted to the surface by a wireline logging cable; and a subassembly pressure/temperature measurement; the improvement comprising:

a) interconnecting mechanically and electrically a mechanical and gaging assembly into said electronics assembly comprising;
   i) using an actuator assembly means to extend and retract at least one pair of gaging pistons,
   ii) utilizing a gaging assembly means which contains gaging pistons fluidly connected with a second piston having a substantially smaller diameter than said gaging pistons where said second piston is interconnected with a linear variable differential transformer shaft whereupon movement of the gaging pistons causes said shaft to move which results in a mechanical gain because of the smaller diameter of said second piston; and
   iii) employing a measuring means to determine the mechanical gain obtained from movement of said shaft which results in the obtainment of minute measurements of borehole creep.

11. The method as recited in claim 10 wherein step a) i) three pairs of gaging pistons are utilized.

12. The method as recited in claim 10 where the gaging pistons seat to said borehole causing transfer fluid movement to an accumulator piston that moves an LVDT shaft which causes an electrical signal to be emitted which can be used to determine the borehole's diameter.

13. The method as recited in claim 10 where the mechanical and gaging assembly contains a pressure equalization assembly which allows the tool to operate in a low differential pressure environment.

14. The method as recited in claim 10 where any movement of the gaging piston is transferred to said second piston by gaging piston fluid when an actuator cylinder port is sealed off.

15. The method as recited in claim 10 where in step a) ii) the second piston measures a positive or a negative movement of the gaging pistons when said second piston is centered by seating pressure exerted on fluid communicating with said second piston.

16. The method as recited in claim 10 where in step a) ii) the second piston has a positive or negative displacement of about 0.500 inch which represents a maximum borehole wall motion of plus or minus 0.005 inch.

17. The method as recited in claim 10 where the gaging pistons are disengaged by reversing an electrical motor which causes fluid flow pressure on closed fluid pressure within said actuator assembly means to be reduced.

18. The method as recited in claim 10 where measurements obtained from step a) ii) are used to determine directions and magnitudes of principal stresses, and to calculate shear modulus, compressibility, rock viscosity, Young's modulus, and Poisson's ratio.

* * * * *